United States Patent
Wei et al.

(10) Patent No.: US 12,410,586 B2
(45) Date of Patent: Sep. 9, 2025

(54) SYSTEMS AND METHODS FOR COLLISION AVOIDANCE FOR SHAPE CHANGING MACHINES

(71) Applicant: Caterpillar Inc., Peoria, IL (US)

(72) Inventors: Mo Wei, Dunlap, IL (US); Jun Zuo, Peoria, IL (US); Jacob C. Maley, Germantown Hills, IL (US); Manoj Pothugunti, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 259 days.

(21) Appl. No.: 17/810,695

(22) Filed: Jul. 5, 2022

(65) Prior Publication Data

US 2024/0011244 A1 Jan. 11, 2024

(51) Int. Cl.
| | |
|---|---|
| *E02F 9/20* | (2006.01) |
| *B60W 30/09* | (2012.01) |
| *E02F 9/24* | (2006.01) |
| *E02F 9/26* | (2006.01) |
| *B60W 50/14* | (2020.01) |

(52) U.S. Cl.
CPC ........... *E02F 9/2033* (2013.01); *B60W 30/09* (2013.01); *E02F 9/24* (2013.01); *E02F 9/26* (2013.01); *B60W 50/14* (2013.01); *B60W 2300/17* (2013.01); *B60W 2520/06* (2013.01); *B60W 2520/10* (2013.01); *B60W 2554/802* (2020.02)

(58) Field of Classification Search
CPC ... E02F 9/2033; E02F 9/24; E02F 9/26; E02F 9/262; E02F 9/265; B60W 30/09; B60W 2554/802; B60W 2300/17; B60W 2520/06; B60W 2520/10
See application file for complete search history.

(56) References Cited

U.S. PATENT DOCUMENTS

| | | | |
|---|---|---|---|
| 9,595,196 B1 * | 3/2017 | Hiranaka | G08G 1/164 |
| 9,616,564 B2 * | 4/2017 | Pfaff | B25J 9/0081 |
| 10,377,125 B2 | 8/2019 | Friend et al. | |

(Continued)

FOREIGN PATENT DOCUMENTS

| | | |
|---|---|---|
| CN | 104420494 B | 5/2018 |
| CN | 111622296 A | 9/2020 |

(Continued)

OTHER PUBLICATIONS

NPL, Thornton, "What's the Difference Between GNSS and GPS?", NPL Date: Jul. 29, 2021, Retrieved from internet Jun. 2024, URL: <https://www.spirent.com/blogs/what-is-the-difference-between-gnss-and-gps> (Year: 2021).*

(Continued)

*Primary Examiner* — Thomas E Worden
*Assistant Examiner* — Benjamin J Brosh (57) ABSTRACT

A collision avoidance system and method for a mobile machine includes determining a boundary zone and providing a notification and/or control command to prevent a collision with another object. A first safety zone associated with a first and second portion of the mobile machine is determined. A second safety zone associated with the second portion of the mobile machine is determined. A boundary zone is determined as a function of a combination of the first and second safety zone. A notification and/or a control command is provided based on a relationship of an object to the boundary zone.

18 Claims, 4 Drawing Sheets

(56) References Cited

U.S. PATENT DOCUMENTS

| | | | |
|---|---|---|---|
| 2004/0158355 A1 | 8/2004 | Holmqvist et al. | |
| 2009/0043462 A1 | 2/2009 | Stratton et al. | |
| 2013/0222573 A1* | 8/2013 | Onuma | E02F 9/24 |
| | | | 348/82 |
| 2014/0111648 A1* | 4/2014 | Ishimoto | B60R 1/28 |
| | | | 348/148 |
| 2015/0142276 A1* | 5/2015 | Wu | E02F 9/2095 |
| | | | 701/50 |
| 2018/0347147 A1 | 12/2018 | Doi et al. | |
| 2019/0262993 A1* | 8/2019 | Cole | B25J 9/1676 |
| 2019/0366544 A1* | 12/2019 | Oka | B25J 9/1666 |
| 2020/0277757 A1* | 9/2020 | Kurokami | E02F 9/24 |
| 2022/0186470 A1* | 6/2022 | Chiba | E02F 9/2285 |
| 2022/0282459 A1* | 9/2022 | Chiba | E02F 9/2033 |
| 2023/0074065 A1* | 3/2023 | Howells | E02F 9/085 |
| 2024/0011251 A1* | 1/2024 | Chiba | E02F 9/262 |

FOREIGN PATENT DOCUMENTS

| | | | |
|---|---|---|---|
| DE | 10324627 A1 * | 1/2005 | G05B 19/4061 |
| JP | 2012001995 A | 1/2012 | |
| JP | 2021-25223 * | 2/2021 | |
| JP | 2021031922 A | 3/2021 | |
| JP | 2022165821 A * | 11/2022 | |
| KR | 20150061822 A | 6/2015 | |
| KR | 20200133876 A | 12/2020 | |
| KR | 20210047985 A | 5/2021 | |
| KR | 20220031077 A | 3/2022 | |

OTHER PUBLICATIONS

Foreign patent documents provided include authority and translation copies in a combined PDF.*

English Translation of JP-2022165821-A using ESPACENET to include paragraph numbers associated with any citations provided in the Office action (Year: 2022).*

Written Opinion and International Search Report for Int'l. Patent Appln. No. PCT/US2023/068854, mailed Oct. 24, 2023 (10 pgs).

* cited by examiner

SYSTEMS AND METHODS FOR COLLISION AVOIDANCE FOR SHAPE CHANGING MACHINES

TECHNICAL FIELD

The present disclosure relates generally to systems and methods for collision avoidance for shape changing machines, and more particularly, to systems and methods for determining an object's proximity to a determined safety boundary.

BACKGROUND

Many activities require or benefit from collision detection and avoidance systems. For example, operators of large shape shifting machinery must navigate job and construction sites, not only while driving the machine, but also while operating extensions of the machine. For example, the operator of an excavator machine must be mindful of building structures, materials, people, or other large vehicles when driving and operating the bucket, arm, and boom of the excavator. Failure to do so may result in collision related accidents that can cause extensive and serious damage including property damage causing delays, or serious personal injury. In order to reduce the likelihood of accidents or collisions, operators of large machinery often rely on collision detection and avoidance systems.

Typically, Collision Alarming and Avoidance Systems (CAAS) fall into two categories. The first type of CAAS relates to large machinery that does not change shape. Using simple calculations, this type of system defines "zones" based on the machines' boundaries, safety tolerances, and stop distances. While this type of system is ideal as it requires limited computational power allowing for easy installment on machinery, this type of system is inadequate for shape shifting machines, such as excavators and shovels, as they fail to consider rotational and shape changes when defining a safety zone.

The second type of CAAS applies complex derivative functions and considers multiple variables (vehicle/object dynamics, speeds, steering, etc.) to calculate multiple trajectories for multiple points of the machine. Using this information, the system must then calculate the probabilities of each possible collision and then filter out potential collisions that do not meet a probability threshold. This second type of system requires high-level computational power and sensors which may not be compatible with small computers and engine control modules (ECM) common on some shape shifting vehicles.

Korean Patent Application Publication No. KR 2021 0047 985, published on May 3, 2021 ("the '985 publication"), describes a collision avoidance system for construction equipment. The system disclosed in the '985 publication uses information of a detected moving obstacle, swing dynamics, and driving operation information, to calculate a collision time with the obstacle. The '985 publication uses a series of equations and derivatives and is an example of the type of CAAS that requires high level computational power and resources.

The disclosed method and system of the present disclosure may solve one or more of the problems set forth above and/or other problems in the art. The scope of the current disclosure, however, is defined by the attached claims, and not by the ability to solve any specific problem.

SUMMARY

In one aspect, a collision avoidance system for a mobile machine, comprises determining a first safety zone associated with a first and second portion of the mobile machine and a second portion of the mobile machine that is movable relative to the first portion of the mobile machine, determining a second safety zone associated with the second portion of the mobile machine, determining a boundary zone as a function of a combination of the first and second safety zone, and providing a notification and/or a control command based on a relationship of an object to the boundary zone.

In another aspect, the system may include that the first and second safety zones are geometric shapes. In another aspect, the geometric shapes may include one of a rectangle or sector.

In one aspect, the mobile machine is an excavator and the first portion is a propelled chassis of the machine, and the second portion is an arm assembly of the mobile machine. In another aspect, the first safety zone is a function of a speed and movement direction of the first and second portion of the machine. Alternatively, another aspect may include that the second safety zone is a function of the speed and movement direction of the second portion of the machine.

In one aspect, the first safety zone is a function of outputs from a first position sensor associated with the first portion of the mobile machine and a second position sensor associated with the second portion of the machine, and the second safety zone is a function of outputs from the second position sensor associated with the second portion of the machine. In another aspect, the first and second safety zones are also a function of GPS position data. Additionally, in another aspect, providing a notification or control command includes an emergency stop control command.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
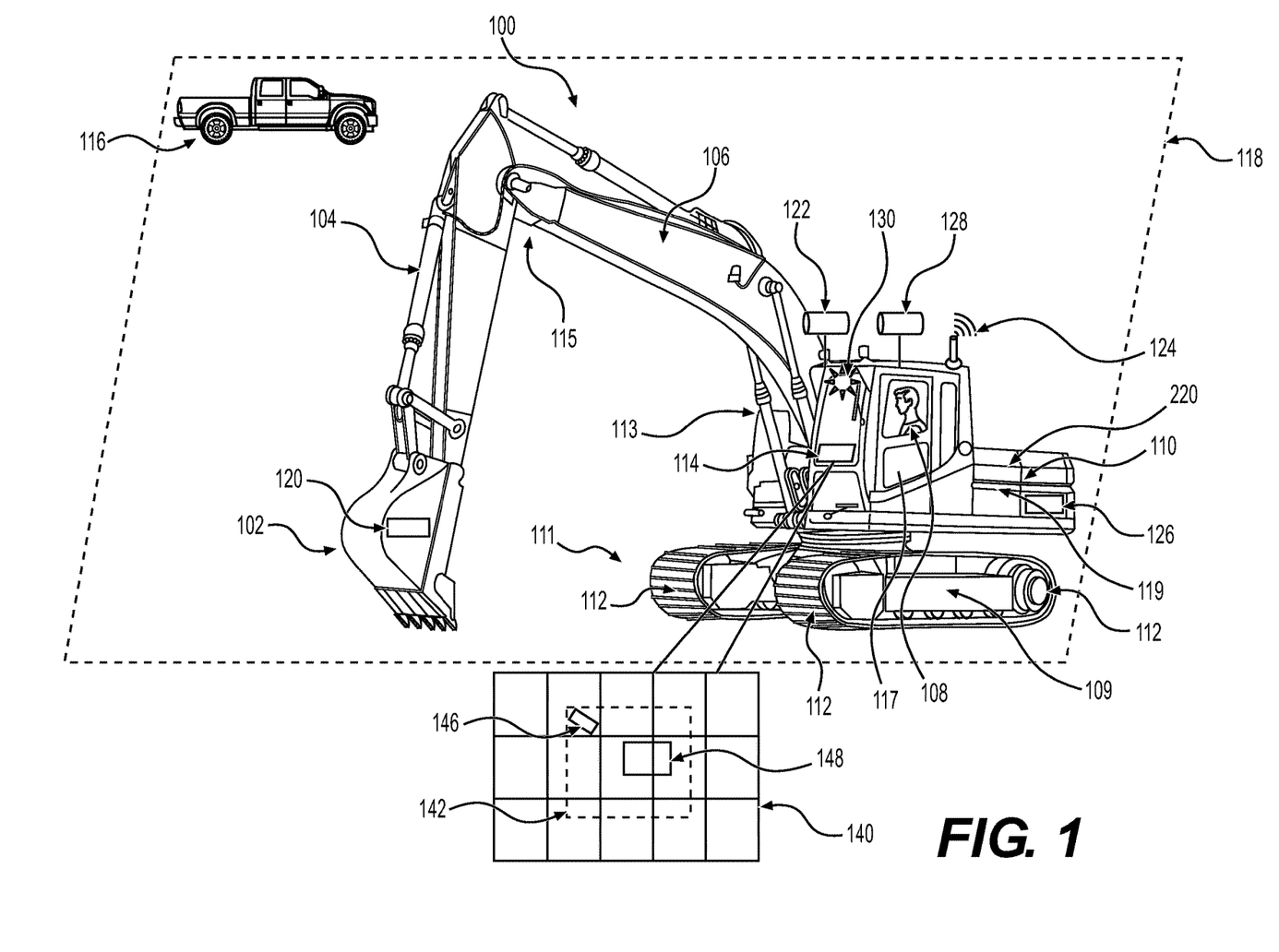
FIG. 1 is a diagram illustrating an exemplary environment of a vehicle system for collision avoidance, according to aspects of the disclosure.

FIG. 1 is a diagram of illustrating an exemplary environment of an excavator 100, according to aspects of the disclosure. While this disclosure will be described in association with an excavator 100, other mobile machines are contemplated, such as, for example, articulated/dump trucks, backhoe loaders, mining shovels, cold planers, dozers, skid steer loaders, motor graders, etc.

The excavator 100 may include a lower portion or lower frame 111, an upper portion or upper frame 113, and an arm assembly 115 that all can move relative to one another. The lower frame 111 may include an undercarriage including, for example, a pair of tracks 112 and a track frame 109. The upper frame 113 may include, for example, a cab 117 and engine 119. The upper frame 113 may be rotationally coupled to the lower frame 111 so as to rotate independent of tracks 112. For example, although the travel direction of excavator 100 may be north, upper frame 113 may be facing northwest. The relative rotational movement between upper frame 113 and lower frame 111 is an example of the shape-shifting ability of excavator 100.

Arm assembly 115 may be coupled to the upper frame 113 to controllably extend towards and away from the upper frame 113. The arm assembly 115 of excavator 100 may include a bucket 102 used for digging and pushing ground materials, or for holding and transporting materials. Materials, such as dirt or gravel, may be transported in bucket 102 or, alternatively, heavy materials such as concrete piping may be strapped to bucket 102 and hoisted/transported as such. The arm assembly 115 of excavator 100 may also include a stick 104 and a boom 106, both of which may provide hydraulic support and mobility for bucket 102. Extension and retraction of the arm assembly 115 may be accomplished by maneuvering the position of stick 104 and boom 106. The extension and retraction of the arm is another shape-shifting ability of excavator 100.

Excavator 100 may also include a variety of sensors, controllers, and/or transceivers/receivers that provide readings, measurements, and/or data related to excavator 100. In an exemplary embodiment, a position sensor may include a bucket inertial measurement unit (IMU) 120 that determines a curl of a bucket or implement positioning. A camera 122 may be provide data for identifing objects, such as object 116, such data including video or image monitoring. A global positioning system, or GPS 124, may utilize signals in conjunction with satellite locations to provide accurate positioning, timing, and navigational information regarding excavator 100. Another positioning sensor may be a chassis IMU 126 that determines the angular velocity or accelleration of chassis 110 as well as the angular velocity or accelleration of arm assembly 115. Other sensors 128 represents a variety of sensors that may be commonly utilized to determine information useful for position, navigation and/or object detection. Examples of other sensors 128 may include boom and stick IMUs, LIDAR, radar, infrared, stereo/tri lens cameras, etc.

As will be discussed in greater detail in FIG. 2, a controller 220 may receive input information from the various sensors and transceivers/receivers, and process the information using processors and/or memory devices to determine various outputs related to excavator 100.

In an exemplary embodiment, excavator 100 may be operated by an operator 108. However, the excavator could also be autonomous or semi-autonomous. In an exemplary embodiment, operator 108 may utilize a display 114 that provides a graphical user interface (GUI) 140. In this exemplary embodiment, the graphical user interface (GUI) 140 is depicted as a map relative to excavator 100. The graphical user interface (GUI) 140 may include representations relative to a GUI excavator 148 such as a GUI object 146 and a GUI boundary zone 142. In this exemplary embodiment, the GUI object 146 is a representation of a pickup truck indicated as object 116. Although object 116 is moving in this exemplary embodiment, object 116 may be stationary and may include objects of various sizes and shapes. Furthermore, in this exemplary embodiment, GUI boundary zone 142 is a representation of boundary zone 118. Boundary zone 118 may be a zoned area depicting an area where an object collision may occur. Boundary zone 118 may be determined in a variety of ways and may result in a variety of geometric shapes as will be discussed in greater detail below.

Alert 130 may be used to provide operator 108 with a variety of notifications. The types of notifications may relate generally to object detection or collision avoidence and will be discussed in greater detail below. The alert may be visual, such as by a flashing light indication, audible, or a combination of both.

Figure 2:
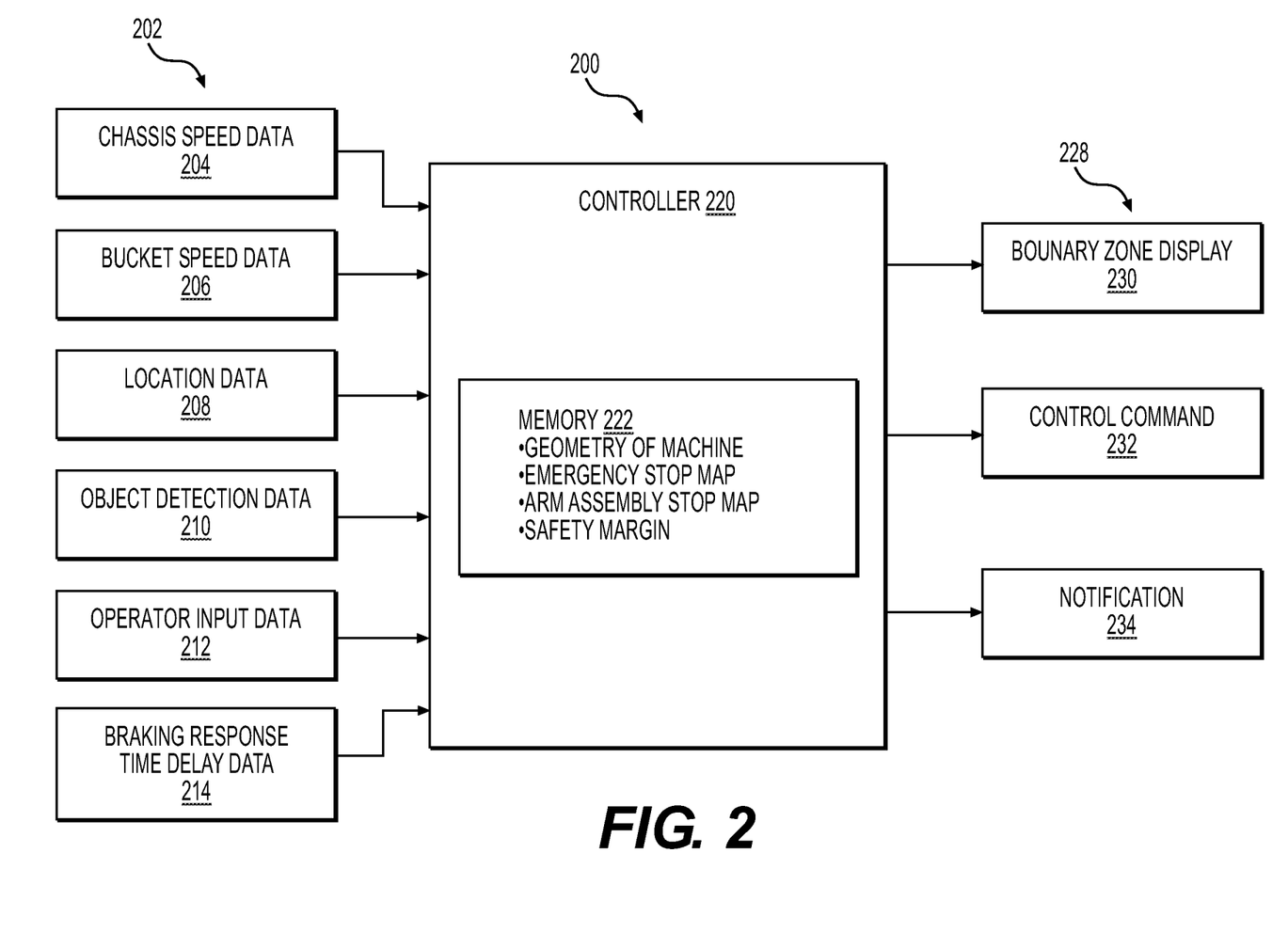
FIG. 2 illustrates a diagram of an exemplary controller system of the vehicle system of FIG. 1.

FIG. 2 illustrates a diagram of a controller system 200. The controller 220 receives inputs 202, processes the input information, and provides one or more outputs 228. Controller 220 may embody a single microprocessor (CPU) or multiple microprocessors, a memory 222, a secondary storage device, and/or any other means for accomplishing a task consistent with the present disclosure. The memory 222 or secondary storage device associated with controller 220 may store data and/or software routines that may assist controller 220 in performing its functions, such as the functions of method 300 of FIG. 3. Further, the memory 222 or secondary storage device associated with controller 220 may also store data received from the various inputs 202 associated with controller system 200. Numerous commercially available microprocessors can be configured to perform the functions of controller 220. Controller 220 may embody a non-transitory machine-readable medium that stores information that, when executed by controller 220, causes the controller system 200 to perform instructions and may be computer-implemented. It should be appreciated that controller 220 could readily embody a general machine controller capable of controlling numerous other machine functions. Alternatively, a special-purpose machine controller could be provided. Further, one or more operations of controller 220, may be performed remote from excavator 100 and communicated to excavator 100. Various other known circuits may be associated with controller 220, including signal-conditioning circuitry, communication circuitry, actuation circuitry, and other appropriate circuitry.

Inputs 202 to controller 220 may include, for example, chassis speed data 204 (traveling speed and direction of upper frame 113 and lower frame 111) received from chassis IMU 126. Using the other information in combination with the speed and direction determined from the chassis IMU 126, other information may be obtained such as attitude, orientation, position, velocity, acceleration and rotation speed of the chassis of excavator 100. Similarly, bucket speed data 206 may be received in controller 220 using the angular velocity or acceleration determined from the chassis IMU 126. Other bucket information such as attitude, orientation, position, velocity, acceleration and rotation speed may also be obtained. Location data 208 may be determined using information obtained from GPS 124. Optionally, location data 208 may be received by using a navigational map system and initially indicating a start point, either manually, or using GPS 124. Object detection data 210 may be determined using, for example, camera 122, LIDAR, radar, infrared, or other sensory/information gatherers. As an exemplary embodiment, camera 122 may use motion detection to identify moving objects. Or alternatively, a radar system may be utilized to identify stationary objects based on sent and reflected energy waves. Other means of detecting objects may be included while the machine is in motion or stopped, as understood and appreciated in the art.

Operator input data 212 may be manually entered by operator 108 and may relate to a variety of information. For example, an exemplary embodiment of operator input data 212 may include operator preferences when determining boundary zone 118. For example, the operator may prefer that boundary zone 118 is defined by the safety zone of the upper frame 113 and lower frame 111 plus the swing zone of the arm assembly 115. Alternatively, operator preferences may include a boundary zone 118 that is defined by a rectangle that encompasses the safety zone of the upper frame 113 and lower frame 111 and swing zone of the arm assembly 115. In another exemplary embodiment, operational preferences may be related to alert 130. Operator 108 may, for example, be required to provide operational preferences as to whether alert 130 is to be visual, such as by a flashing light indication, audible, or a combination of both audio and visual. Operator input data 212 may also relate to desired safety distances. Excavator 100 may come with a preset safety distance of 20 feet. Alternatively, operator 108 may input the safety distance to be 30 feet. Operator input data 212 may include input from operator 108 designating which devices may be utilized for navigation. For example, operator 108 may provide operator input data 212 designating that GPS 124 and camera 122 are to be utilized to determine navigation and orientation. Alternatively, operator input data 212 may include a default setting that designates a radar system is to be utilized to identify stationary objects. Operator input data 212 may include other operational preferences that may overide default operational preferences with an input by operator 108.

Inputs 202 to controller 220 may also include braking response time delay data 214. In one example embodiment, braking response time delay data 214 may relate to the distance and time a machine will travel in relation to the detection of an object. For example, braking response time delay data may include a point in time when an initial object detection is made by a perception sensor such as a camera 122, LIDAR, radar, infrared, or other sensory/information gatherers. Braking response time delay data 214 may also include time elapsed and a distance travelled from when the device first detects the object and time taken to confirm the object exists. Braking response time delay data 214 may also include time elapsed and a distance travelled while determining a risk level and selecting and transmitting a course of action. When the course of action is selected, braking response time delay data 214 may also include time elapsed and a distance travelled to account for the reaction time of operator 108 or controller 220 engaging the braking system. Braking response time delay data 214 may also include time elapsed and a distance travelled while braking. When the machine comes to a final stopping point, braking response time delay data 214 may also include a boundary zone 118, as will be discussed in greater detail below.

Controller 220 may utilize inputs 202 and combine it with information in memory 222. Memory information may include a variety of information that may be associated with excavator 100. For example, memory information may include the geometry of the machine or information related to the machine's dimensions. In one exemplary embodiment, the information of the geometry of excavator 100 may include track dimensions, implement dimensions, chassis dimensions, arm dimensions and geometry (e.g., maximum length of the arm, rotational arc of the arm based on the position of boom 106 and stick 104), or other relevant information.

Information in memory 222 may also include a series of maps or data charts. In one example embodiment, a map may include an emergency stop map that correlates the speed or acceleration of excavator 100 to a stopping distance. For example, an emergency stop map may include speeds ranging from 1 to 25 mph and a corresponding distance that excavator 100 will continue to travel before coming to a complete rest for each specific speed value. The emergency stop map may include that at 5 mph, the distance traveled by excavator 100 before coming to a complete stop will be 10 feet. The emergency stop map may also provide that at 10 mph, the distance traveled by excavator 100 before stopping will be 15 feet.

The emergency stop map may be one dimensional, such as in the example embodiment recently described, or it may be two dimensional and include another variable to correlate with a stopping distance. For example, another exemplary embodiment may include a two dimensional emergency stop map that correlates the speed or acceleration of excavator 100, along and a load amount in the bucket, to a stopping distance. As an example, a two dimensional emergency stop map may include that at 5 mph and with 1500 pounds in the bucket, the distance traveled by excavator 100 before stopping will be 20 feet. Or a two dimensional emergency stop map may include that at 10 mph and with 500 pounds in the bucket, the distance traveled by the machine before stopping will be 17 feet. Other variables known in the art may be used to create multiple one or two dimensional emergency stop maps.

Information in memory 222 may also include an arm assembly stop map that correlates the rotational speed or rotational acceleration of the upper frame 113 and arm assembly 115, to a stopping rotational distance. For example, an arm assembly stop map may include speeds ranging from 1 to 10 mph and a corresponding distance the arm assembly 115 will continue to rotate, in degrees or radians, before coming to a complete rest for each specific rotational speed/acceleration value. The arm assembly stop map may include that at a rotational speed of 5 degrees per second, the distance traveled by the bucket and assembly arm, before coming to a complete stop, will be 20 degrees. The arm assembly stop map may also include that at 10 degrees per second, the distance traveled by bucket and assembly arm before coming to a complete stop, will be 27 degrees. Other rotational distances and corresponding rotational speeds may also be included in an arm assembly stop map.

Alternatively, in another exemplary embodiment, an arm assembly stop map may be a two dimensional map and include another variable to correlate with the rotational stopping distance. In this example embodiment, a two dimensional arm assembly stop map may utilize the rotational speed or acceleration of the upper frame 113 and arm assembly 115, along with a load amount in the bucket, to provide a rotational stopping distance of the bucket and arm assembly. As an example, a two dimensional arm assembly stop map may determine that the arm assembly/bucket will rotate 30 degrees if it has a rotational speed of 10 degrees per second and 1000 pounds of materials in the bucket. Alternatively, a two dimensional arm assembly stop map may include that the arm assembly/bucket will rotate 40 degrees if it has a rotational speed of 10 degrees per second and 2000 pounds of materials in the bucket. Other rotational distances corresponding to rotational speed and bucket load may also be considered in a two dimensional arm assembly stop map. Furthermore, other variables known in the art may be considered in a one or two dimensional arm assembly stop map.

In addition, memory 222 may include safety margins. Safety margins may be related to the travel direction of excavator 100 and provide an extra added safety distance when determining possible collisions. For example, memory 222 may require that a safety margin of 5 feet in all directions be included. Alternatively, a safety margin may be related to the rotation of the arm assembly 115 and bucket 102. A safety margin related to arm assembly 115 and bucket 102 may require that a safety margin of an additional 30 degree rotation be factored into an emergency stop zone for avoiding possible collisions. Alternatively, safety margins may be expressed in terms of time and require that a machine stop within 1 second of collision. As time is a function of distance and rate, the safety margins are similar and require little calculations to convert from one expression to the other.

Processing the inputs 202 in controller 220 may allow controller 220 to determine the outputs 228, including, for example, a boundary zone display 230, a control command 232, and/or notification 234. Controller 220 may provide additional outputs in addition to those provided herein. Boundary zone display 230 may represent boundary zone 118 and be displayed to an operator 108 as GUI boundary zone 142 on a GUI display 114 (see FIG. 1). Determining boundary zone 118 will be discussed in greater detail below in connection with FIG. 3.

In another exemplary embodiment, a control command 232 may be one of outputs 228. In another exemplary embodiment, control command 232 may include commands that are related to collision avoidance when it is detected that an object traverses boundary zone 118. For example, a control command may include an emergency stop that automatically terminates operation of excavator 100 by killing all power to any power trains, hydraulic systems, or engines and removing operational control from operator 108 when controller 220 determines that an object traverses boundary zone 118. Alternatively, another exemplary embodiment of a control command 232 may include disabling most operational controls from operator 108 and placing the machine in a standby mode when it is determined that an object is to traverse boundary zone 118. Or in another example embodiment, a control command 232 may include removing or suspending all power to excavator 100 until operator 108 provides an override indication in order to continue to operate the machine. In another example embodiment, outputs 228 may include a control command 232 that overrides steering controls by operator 108 and steers excavator 100 to avoid collision with another object. For example, outputs 228 may include a control command 232 to steer excavator 100 left to avoid colliding with an object in front of excavator 100. In another exemplary embodiment, a control command 232 may include overriding controls made by operator 108 related to the arm of excavator 100. For example, a control command 232 may be to restrict movement of the arm of excavator 100 despite the controls of operator 108 if restricting movement of the arm assembly 115 avoids collision with an object. Other variations of control command 232 may also be utilized as is common and appreciated in the art.

Outputs 228 of controller system 200 may also or alternatively include a notification 234. In one exemplary embodiment, notification 234 may be an alert that notifies operator 108 of a potential collision by utilizing alert 130 to provide operator 108 with a visual alert notification, such as a flashing light, or an audible notification, or a combination of both audio and visual. Alternatively, notification 234 may include providing a visual notification to graphical user interface (GUI) 140 of display 114, such as a flashing or blinking display. Other variations of notification 234 may be utilized as is common and appreciated in the art.

Figure 3:
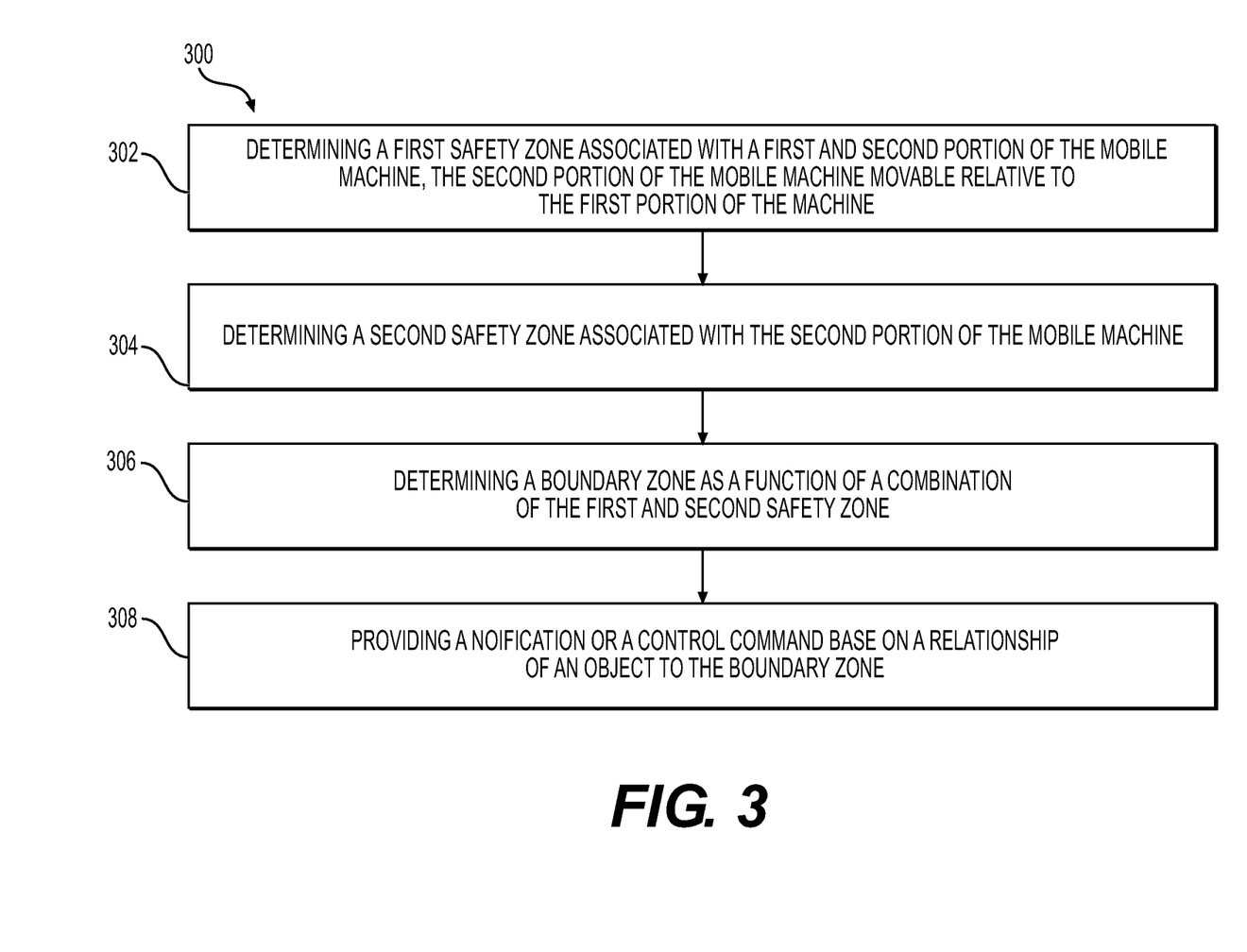
FIG. 3 provides a flowchart depicting an exemplary method for the vehicle system of FIG. 1.

FIG. 3 provides a flowchart of method 300 depicting an exemplary method for collision detection and avoidance. In an exemplary embodiment, the process may include determining a first safety zone associated with a first portion of the mobile machine 302. The first portion of the machine may include lower frame 111 and upper frame 113. In this example embodiment, the upper frame 113 includes arm assembly 115 being fully extended, however, other embodiments may consider various levels of extension, related to arm assembly 115, in determining the first safety zone.

Utilizing information from inputs 202 such as speed and direction of excavator 100, as well as information in memory 222 such as the emergency stop map and a safety margin, controller 220 may provide a first safety zone. In this example embodiment, the first safety zone may provide a boundary or indication of how far the upper frame 113 and lower frame 111 of excavator 100 will continue to travel in the event that power to excavator 100 is instantaneously removed, plus a safety margin from memory 222. The safety margin allows for an additional safety distance beyond where the vehicle is predicted to come to a stop. In the instance where upper frame 113 and lower frame 111 are at rest, the speed of excavator 100 would be 0 miles per hour, but the first safety zone would extend beyond the outline of excavator 100 because in this exemplary embodiment, a safety margin is factored into determining the first safety zone.

In this exemplary embodiment, the method 300 may include determining a second safety zone associated with a second portion of the mobile machine, the second portion of the machine movable relative to the first portion of the machine 304. In this exemplary embodiment, the second portion of the mobile machine may account for the rotation of upper frame 113, and particularly arm assembly 115. The second safety zone associated with a second portion of the mobile machine may include an emergency stop zone for arm assembly 115 plus a safety margin. By utilizing inputs 202 relating to the speed and rotational direction of arm assembly 115, the emergency stop zone for arm assembly 115 may indicate a boundary that identifies the size of a sector (arc of a circle) corresponding to how far the arm assembly 115 of excavator 100 will continue to traverse after an emergency stop (terminating all power to the vehicle) is activated. In this exemplary embodiment, determining the second safety zone may include adding a safety margin from controller 220 and memory 222 that would provide an additional safety distance and buffer beyond where the arm assembly 115 is predicted to stop.

In this exemplary embodiment, the process may include determining a boundary zone as a function of the combination of the first and second safety zone 306. In this exemplary embodiment, determining boundary zone 118 may include identifying the greater boundary of the first safety zone and the second safety zone combined. This may result in an irregular and unsymmetrical shape, e.g., a rectangular shape corresponding to the first safety zone and a sector corresponding to the second safety zone. This embodiment may result in a boundary zone that follows the perimeter of excavator 100 closely and results in fewer control commands and/or notifications and may be displayed on display 114 to be viewed by operator 108.

Alternatively, an exemplary embodiment of the boundary zone may be defined by a rectangle that encompasses both the first and second safety zone. This exemplary embodiment may result in a larger boundary zone and may result in more control commands and/or notifications. Other shapes that encompass both the first and the second safety zone may be considered, such as a circle or square. Additionally, the shape of the boundary zone may be a two-dimensional or three-dimensional polygon. In other exemplary embodiments, the shape of the boundary zone may any other polygonal, geometrical, symmetrical or irregular, shape.

In this exemplary embodiment, the method may include providing a notification or a control command based on a relationship of an object to the boundary zone 308. In one example embodiment, the relationship of an object to the boundary zone may include the object crossing or traversing into the boundary zone. Detecting that an object has traversed a boundary zone 118 may be determined visually by operator 108. Alternatively, the method may utilize sensors or devices to determine an objects speed and travel direction in relation to the boundary zone while the machine is fully stopped. In one exemplary embodiment, the machine may utilize LIDAR by transmitting light waves and measuring the reflected light waves to determine an objects speed and direction. Alternatively, an infrared system may be utilized to detect heat energy from an individual that is walking on the construction site. Other exemplary embodiments for determining an objects speed and direction while the machine is fully stopped, and in relation to the boundary zone, may utilize cameras, radar, or other devices.

In an exemplary embodiment, providing a notification or control command may take place the moment the first object intersects the boundary zone and may include a variety of notification outputs. In one example embodiment, a notification may utilize alert 130 to produce a visible notification, an audible notification, or a combination visible/audible notification as discussed in relation to 234. In another embodiment, a notification 234 may be provided through the graphical user interface (GUI) 140 of display 114. The notification 234 may include displaying the boundary zone 118 as a function of the first and second safety zones on the graphical user interface (GUI) 140 of display 114. An exemplary embodiment may also include display 114 flashing, blinking, or providing textual descriptions relating to the first object entering the boundary zone 118. In another embodiment, a color notification 234 may be provided on display 114 or by utilizing alert 130. For example, a notification 234 may include a yellow warning flash indicating that a collision may occur. Alternatively, a notification 234 may include a red warning flash indicating that a collision is imminent. In another exemplary embodiment, a notification 234 may be a grey flash indicating that another object is present and may potential be a collision threat. Other types of notification 234 known in the art may also be included with other exemplary embodiments.

Providing a control command 232 may include a variety of instructions from the controller 220. As was previously mentioned, one example embodiment may include providing a control command 232 that outputs an emergency response causing the system power of excavator 100 to abruptly cease. Other control commands may exists, including those previously discussed in relation to control command 232 and those that are known in the art, which may be also considered in additional embodiments.

INDUSTRIAL APPLICABILITY

The disclosed method for collision detection and avoidance may be used on any suitable machinery capable of colliding with other objects. An operator 108 may use a collision detection and avoidance system to ensure safety when operating mobile machinery. Controller system 200 may process, in real-time, data and informational inputs 202 to help prevent collisions by providing a boundary zone display 230, executing a control command 232, and/or providing a notification 234. The disclosed method for collision detection and avoidance may find particular applicability in machines operating in industries including construction, mining, farming, etc. Non-limiting examples of machines may include commercial machines, such as excavators and other earth moving vehicles.

Figure 4:
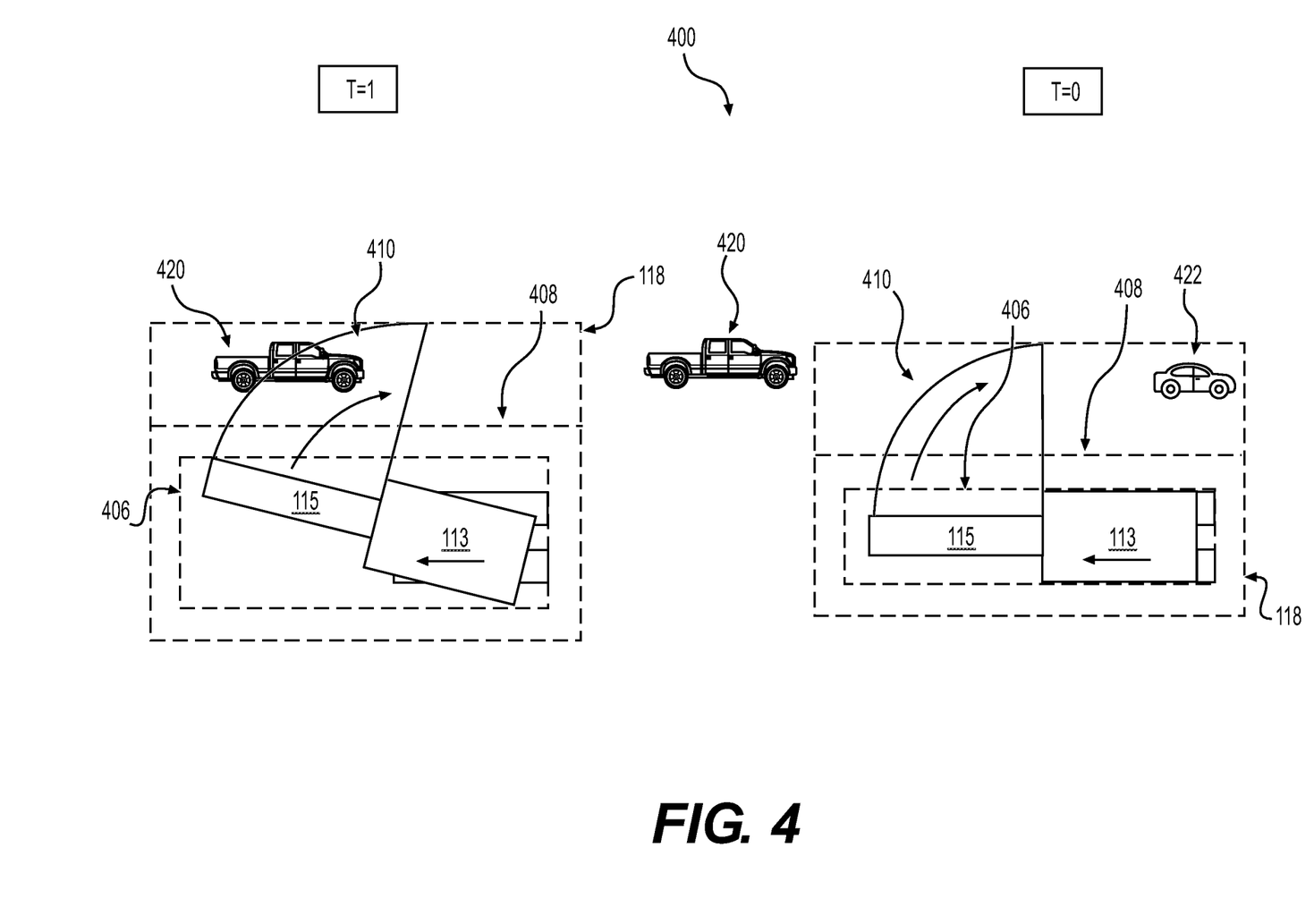
FIG. 4 illustrates a diagram of an exemplary embodiment of the vehicle system of FIG. 1, the controller system of FIG. 2, and the method of FIG. 3.

FIG. 4 illustrates an exemplary embodiment of the operation of controller system 200 and the flow chart of FIG. 3. Diagram 400 depicts boundary zone 118 at two different points in time, T=0 and T=1. In this embodiment, controller 220 may have information from inputs 202 and information in memory 222. Inputs 202 may include chassis speed data 204 (traveling speed and direction of upper frame 113 and lower frame 111) received from chassis IMU 126. In this example, the controller 220 is able to process the data inputs 202 and determine that excavator 100 is traveling at a speed of 3 miles per hour (mph) in a direction from east to west. Other inputs 202 may include bucket speed data 206 received from chassis IMU 126 and may be used by controller 220 to determine an angular velocity and or other information such as attitude, orientation, position, velocity, acceleration and rotation speed. In this example, using chassis IMU 126, controller 220 may determine that arm assembly 115 is rotating at a rotational speed of degrees per second clockwise.

Controller 220 may also determine a first and second safety zone, and a boundary zone by combining the first and second safety zones. With respect to the first safety zone corresponding to the linear travel distance of the arm assembly 115, excavator upper frame 113, and lower frame 111 (not pictured), controller 220 may utilize informational inputs 202 and memory 222 to determine a stop zone 406 indicating the path that excavator 100 will travel if an emergency stop control command 232 were triggered. In this exemplary embodiment, controller 220 may utilize an emergency stop map to determine that excavator 100 will travel 20 feet before stopping at the boundary of stop zone 406. Controller 220 may utilize memory 222 to determine a first safety zone 408 by including a safety margin added to stop zone 406. In this exemplary embodiment, first safety zone 408 outlines an additional distance from stop zone 406 to provide the additional safety distance. For example, controller 220 may determine the first safety zone 408 by utilizing location data 208 and chassis speed data 204 to determine the speed and/or acceleration of excavator 100. Controller 220 may access memory 222 to add a safety margin of an additional 5 feet from stop zone 406 to determine the boundary for the first safety zone 408. Thus, in this exemplary embodiment, first safety zone 408 would be 25 feet in front of excavator 100 and 5 feet of distance would be added to the back and sides of stop zone 406 to create first safety zone 408.

At T=0, arm assembly 115 is rotating in a clockwise direction at a rotational speed. Input data such as bucket speed data 206, location data 208, and chassis speed data 204 may be utilized to determine the rotational speed and/or acceleration of arm assembly 115 and excavator upper frame 113. An arm assembly stop map may be used to determine a swing zone or second safety zone 410. In this embodiment, second safety zone 410 shows the rotational path as a sector that the arm assembly 115 will traverse in the event that an emergency stop were triggered. For example, an emergency stop while arm assembly 115 is rotating clockwise may result in the arm rotating an additional 90 degrees (approximation). In another exemplary embodiment, a safety margin may also be considered to determine the second safety zone.

At T=0, controller 220 may combine the first safety zone and the second safety zone to form boundary zone 118. In this exemplary embodiment, boundary zone 118 is defined as a rectangle that encompasses first safety zone 408 and second safety zone 410. However, as explained previously, other embodiments may determine boundary zone 118 using alternative methods that produce geometrically different or irregular shapes and/or polygons.

For example, another embodiment's boundary zone may simply be an irregular shape that is the combination of first safety zone 408 and second safety zone 410. In this alternative embodiment, stationary object 422 would not trigger a control command 232 and/or notification 234 at T=0 because stationary object 422 would be outside the boundary zone that is an irregular shape comprising the first safety zone 408 and second safety zone 410.

Referring back to the embodiment of FIG. 4, at T=0, controller 220 may utilize object detection data 210 from camera 122, LIDAR, radar, infrared, or other sensory/information gatherers to determine an object's initial point and traveling direction while the machine is stopped. In this exemplary embodiment, stationary object 422 would have been detected and controller 220 would utilize the object detection data 210, including the object's initial point and traveling direction, to monitor the situation. In one exemplary embodiment, controller 220 may be prepared to output a control command 232 of an emergency safety stop the moment the detected object were to intersect boundary zone 118. At the moment of an object intersecting boundary zone 118, an emergency stop control command 232 would cause all operational movement to cease. Alternatively, or in addition, controller 220 may output a notification 234 such as an audio, visual, or combination audio and visual, to operator 108.

In the exemplary embodiment at T=1, arm assembly 115 has rotated approximately degrees and is continuing to rotate in a clockwise direction at the same rotational speed determined from bucket speed data 206. Second safety zone 410 represents the rotational path across multiple sectors of arm assembly 115 in the event that an emergency stop were triggered, Compared to second safety zone 410 at T=0, the second safety zone 410 at T=1 has also rotated 15 degrees. In this exemplary embodiment at T=1, controller 220 may include a control command 232 such as an emergency stop while arm assembly 115 is rotating clockwise because controller 220 may determine using an arm assembly stop map that an emergency stop control command would result in arm assembly 115 rotating an additional 90 degrees (approximation) and striking moving object 420. Again, in this exemplary embodiment, boundary zone 118 is a rectangle that encompasses first safety zone 408 and second safety zone 410. In this exemplary embodiment, moving object 420 would trigger controller 220 to perform an emergency stop control command 232 as soon as moving object 420 intersected boundary zone 118. At the moment of intersecting boundary zone 118, an emergency stop control command would cause all operational movement to cease. In another embodiment, controller 220 may determine the object's speed and position, or an initial and final location, in relation to boundary zone 118 and perform an emergency stop control command 232 by comparing the object's final location to the boundary zone 118. Alternatively, as another embodiment may include safety zones in relation to time, the final location of object 420 may be compared to the later time between the first safety zone and the second safety zone when determining when to issue an emergency stop control command 232. Other embodiments of when to issue a control command 232 may exist and/or include a notification 234 of an audio, visual, or a combination of audio and visual provided to operator 108 for notifying of a potential collision.

Thus, this method is able to prevent and detect possible collisions with other objects for shape shifting, heavy machinery without requiring extensive calculations or high computational power from devices. Instead, collision avoidance is achieved using minimal calculations and standard sensors that are compatible with both small and large/heavy machinery.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A collision avoidance system for a machine, comprising:
    a safety zone system installed on the machine, the safety zone system:
    determining a first safety zone associated with and encompassing a first and second portion of the machine, the second portion of the machine movable relative to the first portion of the machine such that at least a component of the second portion of the machine is outside of the first safety zone;
    determining a second safety zone associated with the second portion of the machine, the second safety zone encompassing the component of the second portion which is outside of the first safety zone, such that the second safety zone extends beyond the first safety zone,
    wherein the component of the second portion is movable between:
        first and second positions in a first area outside of the first safety zone, wherein the first area encompasses an entire rotational path of movement of the second portion in a first direction, and
        third and fourth positions in a second area outside of the first safety zone, wherein the second area encompasses an entire rotational path of movement of the second portion in a second direction,
    wherein the second safety zone includes either the first area or the second area depending on whether the second portion is moving towards the first area or the second area;
    determining a boundary zone as a function of a combination of the first and second safety zones; and
    providing a notification and/or a control command based on a relationship of an object to the boundary zone.

2. The collision avoidance system of claim 1, wherein the first and second safety zones are geometric shapes, and wherein the geometric shapes include one of a rectangle or sector.

3. The collision avoidance system of claim 1, wherein the machine is an excavator and the first portion is a propelled chassis of the machine, and the second portion is an arm assembly of the machine.

4. The collision avoidance system of claim 1, wherein the first safety zone is determined as a function of a speed and movement direction of at least one of the first portion and second portion of the machine.

5. The collision avoidance system of claim 4, wherein the second safety zone is determined as a function of the speed and movement direction of the second portion of the machine.

6. The collision avoidance system of claim 1, wherein the first safety zone is determined as a function of outputs from a first position sensor associated with the first portion of the machine and a second position sensor associated with the second portion of the machine, and the second safety zone is a function of outputs from the second position sensor associated with the second portion of the machine.

7. The collision avoidance system of claim 1 wherein the first and second safety zones are determined as a function of GPS position data.

8. The collision avoidance system of claim 1, wherein the providing of a notification or control command includes an emergency stop control command.

9. The collision avoidance system of claim 1, wherein the second safety zone includes a perimeter, wherein at least a portion of the perimeter is arcuate.

10. A computer-implemented collision avoidance method for a machine, the method comprising:
   determining a first safety zone associated with and surrounding a first portion of the machine and second portion of the machine, the second portion of the machine movable relative to the first portion of the machine such that at least a first component of the second portion is movable from a location inside the first safety zone to a location outside of the first safety zone;
   determining that the first component of the second portion is at moving toward the location outside of the first safety zone;
   determining a second safety zone associated with the first component of the second portion of the machine which is moving toward the location outside of the first safety zone, such that at least a part of the second safety zone extends outside of the first safety zone, wherein the second safety zone includes an entire rotational path of the first component of the second portion outside of the first safety zone, when the first component moves in a first direction;
   determining a boundary zone as a function of a combination of the first and second safety zones; and
   providing at least one of a notification and/or or a control command based on a relationship of an object to the boundary zone.

11. The method of claim 10, wherein the first and second safety zones are geometric shapes, and wherein the geometric shapes include one of a rectangle or sector.

12. The method of claim 10, wherein the machine is an excavator and the first portion is a propelled chassis of the machine, and the second portion is an arm assembly of the machine.

13. The method of claim 10, wherein the first safety zone is determined as a function of a speed and movement direction of at least one of the first portion and second portion of the machine.

14. A non-transitory machine-readable medium storing instructions that, when executed by a computing system, causes the computing system to perform a collision avoidance method for a machine, the method including:
   determining a first safety zone associated with a first portion and second portion of the machine such that the first and second portions are within the first safety zone, the second portion of the machine movable relative to the first portion of the machine such that the second portion of the machine moves between locations inside and outside of the first safety zone;
   determining a second safety zone associated with a component of the second portion, the second safety zone corresponding to an entire range of possible movement of the component of the second portion of the machine outside of the first safety zone, when the component moves in a predetermined direction;
   determining a boundary zone as a function of a combination of the first and second safety zone; and
   providing a notification and/or a control command based on a relationship of an object to the boundary zone.

15. The non-transitory machine-readable medium of claim 14, wherein the first and second safety zones are geometric shapes, and wherein the geometric shapes include one of a rectangle or sector.

16. The non-transitory machine-readable medium of claim 14, wherein the machine is an excavator and the first portion is a propelled chassis of the machine, and the second portion is an arm assembly of the machine.

17. The non-transitory machine-readable medium of claim 14, wherein the first safety zone is a function of a speed and movement direction of at least one of the first portion and second portion of the machine.

18. The non-transitory machine-readable medium of claim 14, wherein the second safety zone is determined as a function of a speed and movement direction of the second portion of the machine.

* * * * *